2,716,595
Patented Aug. 30, 1955

2,716,595

MANUFACTURE OF RED HYDROUS FERRIC OXIDE

Benjamin Harrison Marsh, Santiago, Chile, assignor to C. K. Williams & Co., East St. Louis, Ill., a corporation of Delaware No Drawing. Application January 28, 1949,
Serial No. 73,453

8 Claims. (Cl. 23—200)

This invention is concerned with the production of iron pigment and more particularly with the preparation of pure red hydrous ferric oxide.

It is an object of the present invention to provide a method for producing iron pigments of soft texture, free of grits and deleterious salts, for use in the color and printing ink business as well as the rubber cement and linoleum industries and the various arts requiring such pigment.

As manufactured at the present time, red iron pigments are made by calcining yellow iron oxide or by roasting copperas. Those made by the calcination of yellow iron oxide are as a rule lacking in brilliancy when ground in linseed oil and possess high oil absorption. The red oxides made by roasting copperas are hard of texture and ofen contain grits of insoluble manganese compounds and therefore are deleterious to many industries requiring red iron pigments.

Attempts have been made to produce red iron pigment without the calcination step, such as by electrolyzing an ionizable salt solution in the presence of an oxidizing agent or by boiling ferric hydroxide under pressure, but owing to the high cost of manufacture and other objectionable features, these methods are of little value.

I have found that it is possible to produce soft textured brilliant red iron pigments free from deleterious impurities, by wet chemical precipitation at elevated temperatures below 212° F. by oxidizing metallic iron while suspended in an aqueous solution of ferrous sulphate or ferrous chloride in the presence of oxygen containing gases and a suspension of a suitable iron compound.

The shade of red and other properties of red iron pigments produced by my invention can be controlled by regulating according to the amount of insoluble iron compound employed along with other requisites which are defined within these specifications. Likewise, temperatures and concentrations of the soluble iron salt used along with the preparation of the insoluble iron compound can be used with varying results as to colors, tinting strength in white lead, etc., and texture of the red iron pigment desired. Alkaline compounds or mixtures of alkaline compounds can be used in the preparation of the iron compound with varying results.

The essential idea involved in my invention is that iron metal is directly oxidized into red iron pigment of great tinctorial strength and purity in a single operation in aqueous solution at elevated temperatures ranging up to 212° F.

In its broadest aspect, my invention comprises preparing hydrous ferric oxide by oxidizing metallic iron while immersed in a soluble iron salt in the presence of a prepared seed made by the addition of a base to a soluble iron salt, while injecting oxygen containing gases under such conditions that the oxidation takes place alternately in an acid and an alkaline condition, or vice versa.

According to my process, one mode of procedure is to prepare a started seed by the addition of a base to a ferrous salt somewhat short of the molecular amount required to combine with all the iron salt present while injecting oxygen containing gases.

The mixture at this stage being somewhat under pH 6.0 is aerated until further oxidation ceases, whereupon a base such as sodium hydroxide is added, thereby reducing the acility and raising the pH to over 8.0 preferably between pH 9 and pH 14, showing marked alkalinity. Oxidation by oxygen containing gases is contniued until the iron suspension is entirely oxidized over to the ferric state, whereupon more ferrous liquor is added until the solution assumes a pH of 6 or under, preferably about pH 5.0 during which time oxidation continues until all the seed is oxidized to the ferric state.

This mixture is then diluted with water, depending upon the concentration desired, whereupon, metallic iron is immersed therein and oxygen containing gases are forced through the solution, preferably by injecting air supplied by a blower or air compressor. Heat is applied, preferably steam to accelerate the reaction. The temperature of the solution is preferably maintained at about 170° F. but any elevated temperature below 212° F. will serve the purpose to carry on the reaction. In place of forcing oxygen containing gases through the solution, the operation may be conducted by continually pumping the solution over and through metallic iron so that the exposed surface of the solution will take up oxygen from the atmosphere by continued circulation of the solution over metal. In the course of the process and during the oxidation of metal, a thin film of hydrated ferrous oxide of iron forms on the metal, ranging in color from black at the surface of the metal to reddish brown and finally red. The oxidation of the metal proceeds rapidly as long as oxygen media is supplied, resulting in the formation of red hydrous iron oxide. As oxidation proceeds, the shade of red tends to run from light to dark. If the suspension becomes too thick for proper oxidation, it may be divided in separate apparatus and diluted to the proper consistency to allow the oxidation to proceed satisfactorily.

The step of oxidizing the precipitate in acid and alkaline medium alternately may be carried on as many times as desired. The pH values mentioned are only critical to the extent that they designate the acid or alkaline condition of the mixture while undergoing oxidation and can vary to a large extent according to the shade of red pigment desired. Likewise, the seed can be started in either an acid or alkaline condition as will be apparent to any one skilled in the art.

In carrying out my invention, I preferably proceed as follows:

Five hundred and seventy kilograms of copperas (FeSO$_4$7H$_2$O) is dissolved in 8,000 liters of water and to the resultant solution, at 60° F., is added, 115 kilograms of sodium hydroxide dissolved in 1,000 liters of water while being subjected to oxidation by oxygen containing gases. When further oxidation ceases, 115 kilograms of sodium hydroxide in 1,000 liters of water is added during continuous oxidation and when the iron suspension present is entirely oxidized over the ferric state, more copperas liquor is added until the solution assumes a pH of about 5.0, during which time oxidation continues until all the seed is oxidized to the ferric state. Oxidation is allowed to proceed until the suspension is entirely in the ferric state, whereupon the metallic iron is immersed therein, oxidation by oxygen containing gases is resumed and continued at elevated temperatures, preferably about 170° F. for two days or until such time as the desired shade of red pigment is obtained. In about 24 hours, the mixture assumes a light red shade and as the oxidation continues the mixture assumes darker shades of red, ranging from light Venetian red to dark purple, depending upon length of time the mixture is undergoing oxidation. The red iron pigment is then filtered, washed and dried at about 212° F., or the pulp can be ground in oil in the usual manner.

I preferably employ sodium hydroxide as the base to form the initial seeds, though any alkali metal base, alkaline earth metal base or mixtures of alkali metal bases can be employed with varying results.

Also, I may employ ferric sulphate, ferrous chloride or ferric chloride in lieu of the ferrous sulphate in starting the initial seed.

Likewise, lower or higher temperatures may be used in the preparation of the suspension of the iron compound, though I have found temperatures of 60° F. and lower to be preferable.

By this process, red iron pigment can be economically produced, ranging in color from very light brilliant Venetian red to dark maroon, Indian red and purple shades having brilliant mass tone in linseed oil and great tinctorial strength when mixed with zinc oxides, white lead, etc.

While I have described a preferred method of carrying out my invention, it will be understood that various modifications may be made without departing from the spirit and scope of the accompanying claims.

I claim:

1. A process of producing red hydrous ferric oxide of pigment grade which comprises, passing oxygen-containing gas into a soluble iron salt solution having a pH value outside the range of 6 to 8 until further oxidation ceases, altering the pH value of the solution such that its ion concentration changes to the other side of neutrality to a value outside said range, again passing oxygen-containing gases through the solution until oxidation ceases, again altering the pH value of the solution such that its ion concentration changes to the original side of neutrality to a value outside said range, and again passing oxygen-containing gases through said solution until oxidation ceases, the alteration of the pH value being effected on the one hand by the addition of an alkali and on the other hand by the addition of a soluble iron salt, thereby forming a hydrated ferric oxide seed in an iron salt solution, contacting the resulting liquid mass containing said seed with metallic iron and introducing an oxygen-containing gas whereby said iron is oxidized and a red iron oxide is obtained, discontinuing the oxidation when the desired shade of red to purple is obtained and separating said iron oxide from the liquid mass and any remaining metal, thereby obtaining an iron oxide of pigment grade.

2. A process of producing red hydrous ferric oxide of pigment grade which comprises, forming said seed at a temperature below about 60° F. by a series of steps involving passing oxygen-containing gas into a soluble ferrous salt solution having a pH value outside the range of 6 to 8 until further oxidation ceases, altering the pH value of the solution such that its ion concentration changes to the other side of neutrality to a value outside said range, again passing oxygen-containing gases through the solution until oxidation ceases, again altering the pH value of the solution such that its ion concentration changes to the original side of neutrality to a value outside said range, and again passing oxygen-containing gases through said solution until oxidation ceases, the alteration of the pH value being effected on the one hand by the addition of an alkali and on the other hand by the addition of a soluble iron salt, thereby forming a hydrated ferric oxide seed in an iron salt solution, contacting the resulting liquid mass containing said seed with metallic iron and introducing an oxygen-containing gas whereby said iron is oxidized and a red iron oxide is obtained, discontinuing the oxidation when the desired shade of red to purple is obtained and separating said iron oxide from the liquid mass and any remaining metal, thereby obtaining an iron oxide of pigment grade.

3. A process of producing red hydrous ferric oxide of pigment grade which comprises, passing oxygen-containing gas into a soluble iron salt solution having a pH value outside the range of 6 to 8 but not less than 5 and not more than 14 until further oxidation ceases, altering the pH value of the solution such that its ion concentration changes to the other side of neutrality to a value outside said 6–8 range, again passing oxygen-containing gases through the solution until oxidation ceases, again altering the pH value of the solution such that its ion concentration changes to the original side of neutrality to a value outside said 6–8 range, and again passing oxygen-containing gases through said solution until oxidation ceases, the alteration of the pH value being effected on the one hand by the addition of an alkali and on the other hand by the addition of a soluble iron salt, thereby forming a hydrated ferric oxide seed in an iron salt solution, contacting the resulting liquid mass containing said seed with metallic iron and introducing an oxygen-containing gas whereby said iron is oxidized and a red iron oxide is obtained, discontinuing the oxidation when the desired shade of red to purple is obtained and separating said iron oxide from the liquid mass and any remaining metal, thereby obtaining an iron oxide of pigment grade.

4. A process for the production of red to purple ferric oxide pigments which comprises, introducing an oxygen-containing gas until oxidation ceases into an aqueous iron salt solution having an ion concentration on one side of neutrality, altering the ion concentration of the reaction mass obtained until it changes to the other side of neutrality, again introducing an oxygen-containing gas until oxidation ceases into the reaction mass, again altering the ion concentration of the reaction mass obtained until it changes back to the original side of neutrality and again introducing an oxygen-containing gas until oxidation ceases, the alteration of the ion concentration being effected on the one hand by the addition of an alkali and on the other hand by the addition of a soluble iron salt, thereby forming a hydrated ferric oxide seed in an iron salt solution, contacting the resulting liquid mass containing said seed with metallic iron and introducing an oxygen-containing gas whereby said iron is oxidized and a red iron oxide is obtained, discontinuing the oxidation when the desired shade of red to purple is obtained and separating said iron oxide from the liquid mass and any remaining metal, thereby obtaining an iron oxide of pigment grade.

5. A process for the production of red to purple ferric oxide pigments which comprises passing oxygen-containing gas into a soluble iron salt solution having an acidity of a pH value below 6 until further oxidation ceases, adding an alkali to said solution on a quantity which raises the pH value to an alkalinity of a pH value above 8, again passing oxygen-containing gases through the solution until oxidation ceases, adding a soluble iron salt of said solution in a quantity which increases its acidity to a pH value below 6, and again passing oxygen-containing gases through said solution until oxidation ceases, thereby forming a hydrated ferric oxide seed, contacting the resulting liquid mass containing said seed with metallic iron and introducing an oxygen-containing gas whereby said iron is oxidized and a red iron oxide is obtained, discontinuing the oxidation when the desired shade of red to purple is obtained and separating said iron oxide from the liquid mass and any remaining metal, thereby obtaining an iron oxide of pigment grade.

6. A process for the production of red to purple ferric oxide pigments which comprises, passing oxygen-containing gas into a soluble iron salt solution having a pH value outside the range of 6 and 8 but not less than 5 and not more than 14 until further oxidation ceases, altering the pH value of the solution such that its ion concentration changes to the other side of neutrality to a value outside said 6–8 range, again passing oxygen-containing gases through the solution until oxidation ceases, again altering the pH value of the solution such that its ion concentration changes to the original side of neutrality to a value outside said 6–8 range, and again passing oxygen-containing gases through said solution until oxidation ceases, the alteration of the pH value being effected on the one hand by the addition of an alkali and on the other hand by the addition of a soluble iron salt, thereby forming a hydrated ferric oxide seed in an iron salt solution, contacting the resulting liquid mass containing said seed with metallic iron and introducing an oxygen-containing gas whereby said iron is oxidized and a red iron oxide is obtained, discontinuing the oxidation when the desired shade of red to purple is obtained and separating said iron oxide from the liquid mass and any remaining metal, thereby obtaining an iron oxide of pigment grade.

7. A process for the production of red to purple ferric oxide pigments from metallic iron as the primary source which comprises dissolving an iron salt in water, introducing oxygen into the resulting aqueous iron salt solution having an ion concentration on one side of neutrality, until oxidation substantially ceases, changing the ion concentration of the reaction mass to the other side of neutrality, again introducing oxygen into the reaction mass until oxidation substantially ceases, again changing the ion concentration of the reaction mass back to a pH value on the original side of neutrality, again introducing oxygen into the reaction mass until oxidation substantially ceases, the alteration of the ion concentration being effected on the one hand by the addition of an alkali and on the other hand by the addition of a soluble iron salt, thereby forming a hydrated ferric oxide seed in the reaction solution, contacting the resulting seed in an iron salt solution with metallic iron and introducing oxygen into the solution during said contact whereby said iron is oxidized and a red iron oxide is obtained, discontinuing the oxidation when the desired shade of red to purple is obtained and separating said iron oxide from the liquid mass and any remaining metal, thereby obtaining an iron oxide of the said range of color of pigment grade.

8. A process for the production of red to purple ferric oxide pigments which comprises, dissolving ferrous sulfate in water, introducing oxygen into the solution obtained until oxidation substantially ceases, adding an alkali to the said solution in an amount which changes the same to the alkaline side of neutrality, again introducing oxygen into the reaction mass until oxidation substantially ceases, adding a ferrous salt to the reaction mass until the solution becomes acidic, again introducing oxygen until oxidation substantially ceases, thereby forming a hydrated ferric oxide seed in an iron salt solution, contacting said solution containing said seed with metallic iron and with oxygen whereby said iron is oxidized and a red iron oxide is obtained, discontinuing the oxidation when the desired shade of red to purple is obtained and separating said iron oxide from the liquid mass and any remaining metal, thereby obtaining an iron oxide of the said range of color of pigment grade.

References Cited in the file of this patent

UNITED STATES PATENTS

| Number | Name | Date |
|---|---|---|
| 234,595 | Macay | Nov. 16, 1880 |
| 1,368,748 | Penniman et al. | Feb. 15, 1921 |
| 1,424,635 | Fireman | Aug. 1, 1922 |
| 1,501,873 | Tyrer | July 15, 1924 |
| 1,540,445 | Wilson | June 2, 1925 |
| 1,840,326 | Ott et al. | Jan. 12, 1932 |
| 2,090,476 | Fireman | Aug. 17, 1937 |
| 2,111,727 | Plews | Mar. 22, 1938 |
| 2,127,907 | Fireman | Aug. 23, 1938 |
| 2,255,607 | Ayers | Sept. 9, 1941 |
| 2,388,659 | Ryan | Nov. 6, 1945 |
| 2,574,459 | Bennetch | Nov. 13, 1951 |

FOREIGN PATENTS

| Number | Country | Date |
|---|---|---|
| 313,999 | Great Britain | June 21, 1929 |
| 385,646 | Great Britain | Jan. 5, 1933 |